No. 813,859. PATENTED FEB. 27, 1906.
F. H. CARTER.
WIRE STRETCHER.
APPLICATION FILED SEPT. 16, 1905.
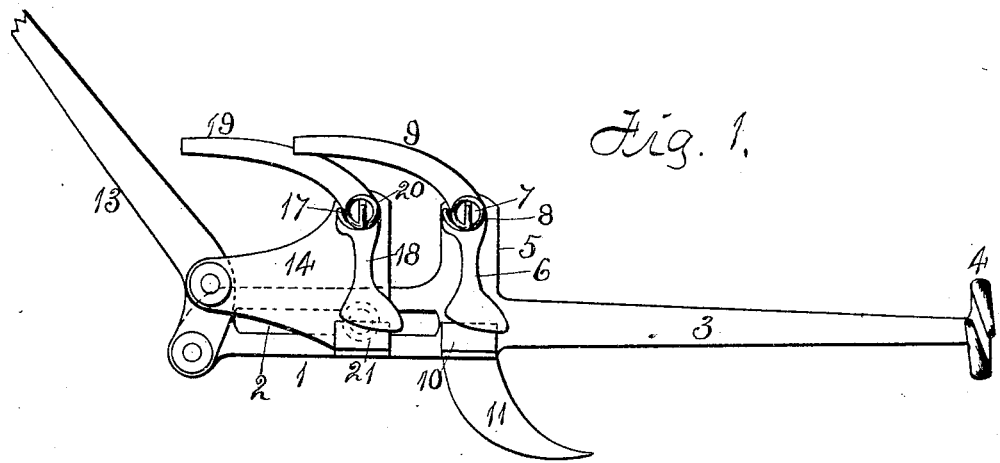
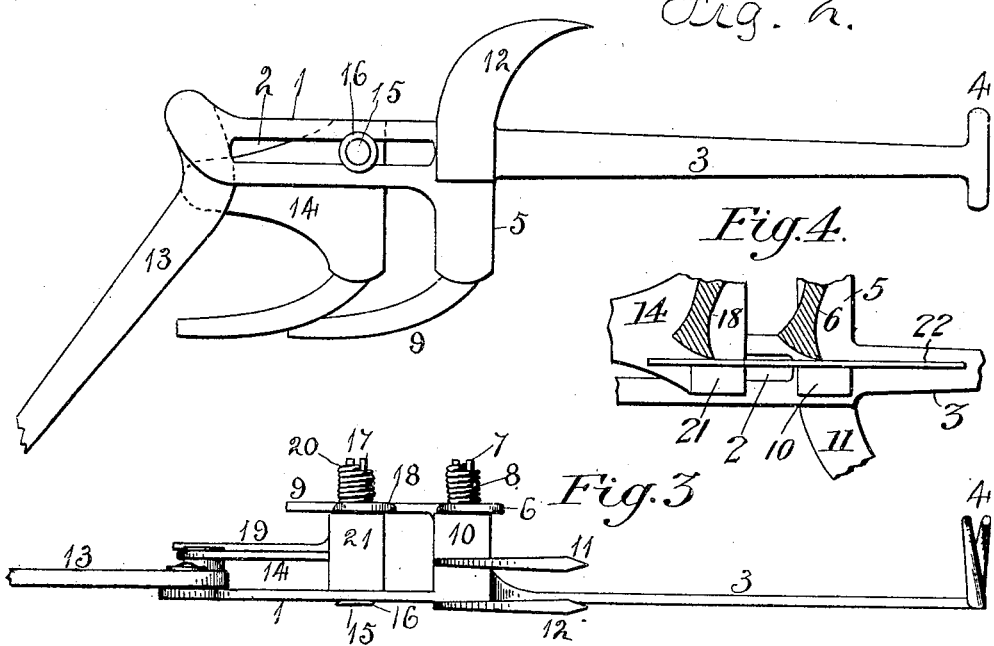
Witnesses:
Jas. Hulme
E. Behel
Inventor:
Floyd H. Carter.
By A. O. Behel
Atty.

UNITED STATES PATENT OFFICE.

FLOYD H. CARTER, OF BELOIT, WISCONSIN.

WIRE-STRETCHER.

No. 813,859.  Specification of Letters Patent.  Patented Feb. 27, 1906.

Application filed September 16, 1905. Serial No. 278,808.

*To all whom it may concern:*

Be it known that I, FLOYD H. CARTER, a citizen of the United States, residing at Beloit, in the county of Rock and State of Wisconsin, have invented certain new and useful Improvements in Wire-Stretchers, of which the following is a specification.

The object of this invention is to form a connection between the movable jaw and its operating-lever in a manner to move the jaw in substantially the lengthwise direction of the wire in order that the wire may be left straight after it leaves the jaw.

The further object of this invention is to provide the wire-stretcher with two holding-prongs in order that the stretcher may be held in a horizontal plane.

In the accompanying drawings, Figure 1 is a top view of my improved wire-stretcher. Fig. 2 is an underface view. Fig. 3 is an edge view. Fig. 4 is a partial plan view in which the dogs 6 and 18 are in section.

The main frame comprises the bar 1, having a lengthwise slot 2 and an extension 3, the free end of which supports the wire-guide 4. From the bar 1 extends a support 5, to the outer end of which is pivoted a dog 6 by being located on the stud 7. A spring 8 is coiled around the stud, having one end connected thereto and its other end engaging the dog. From the dog extends a lever 9, by which the dog may be moved on its pivot. From the bar 1 extends a surface 10, against which the dog 6 rests. From the bar 1 extends a hooked prong 12, and a similar hooked prong 11 extends from the surface 10. To the end of the bar 1 is pivoted a lever 13. To the lever is pivoted a plate 14. This plate has a sliding connection with the bar 1 by the stud 15 extending through the slot 2 and a washer 16 riveted on the stud. The plate 14 has a stud 17, around which is located a dog 18, and from the dog extends a lever 19. A coiled spring 20 surrounds the stud 17, having one end connected to the stud and its other end engaging the dog 18. From the plate 14 extends a surface 21, against which the free end of the dog 18 rests. The hooked prongs 11 and 12 are placed against a post, and the strain of the wire 22 when connected with the stretcher will force the prongs into a post, which will support the stretcher in a horizontal plane. The wire to be stretched is run through the guide-eye 4 of the stretcher and between the dogs and their contacting surfaces.

By means of the lever 13 the movable dog is moved back and forth in the lengthwise direction of the main frame. The dog 6 will hold the wire. As the dog 18 is moved toward the dog 6 it will slip on the wire, and when it is moved in the opposite direction it will draw the wire with it.

By forming a sliding connection between the dog 18 and the main frame the dog will pull the wire past the dog 6, and in nearly a straight line, which will prevent kinking of the wire.

I claim as my invention—

In a wire-stretcher, the combination of a main frame, a holding-dog supported by the main frame, a lever pivotally connected to the main frame, the main frame provided with a lengthwise slot, a plate pivoted at one end with the lever and its other end slidably located in the slot, and a dog supported by the plate.

FLOYD H. CARTER.

Witnesses:
 JOEL B. DOW,
 IRWIN DICKINSON.